March 17, 1931. E. G. JOHANSSON 1,796,932
CABINET
Filed Nov. 26, 1926 2 Sheets-Sheet 1
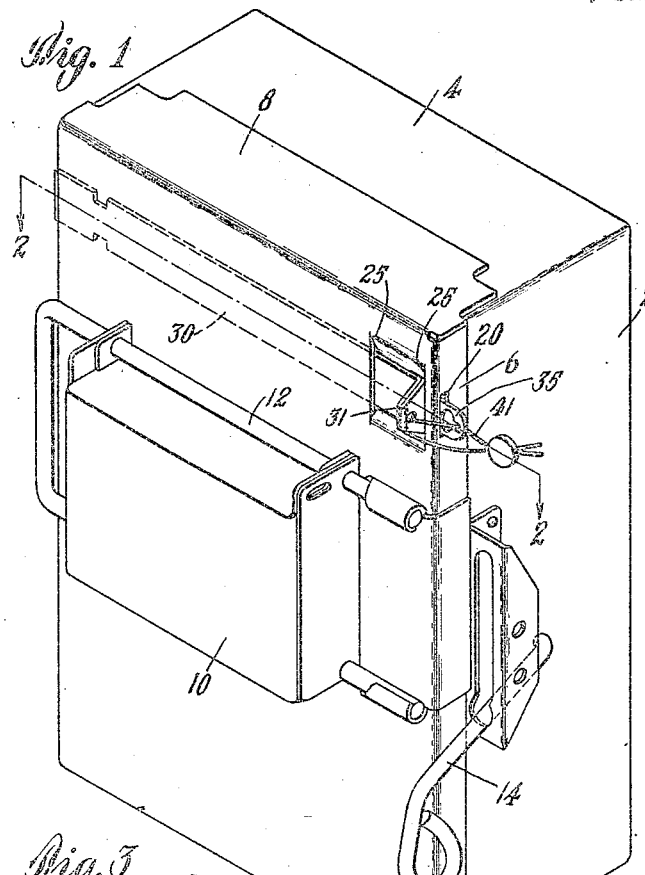
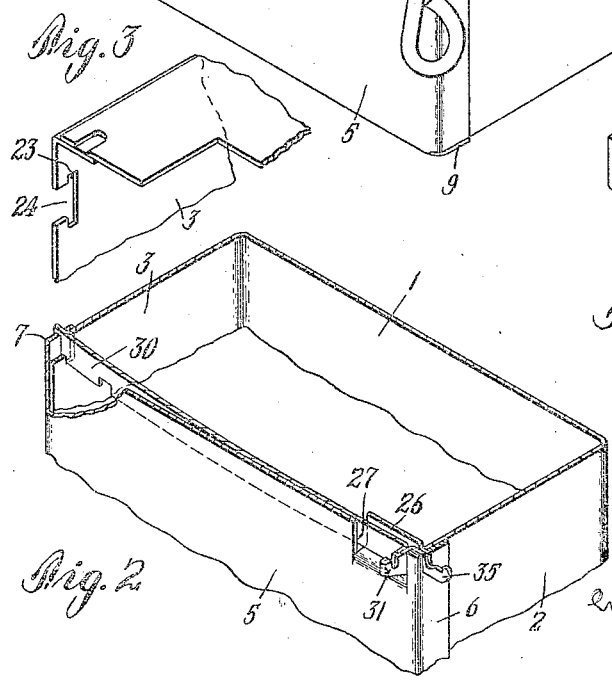
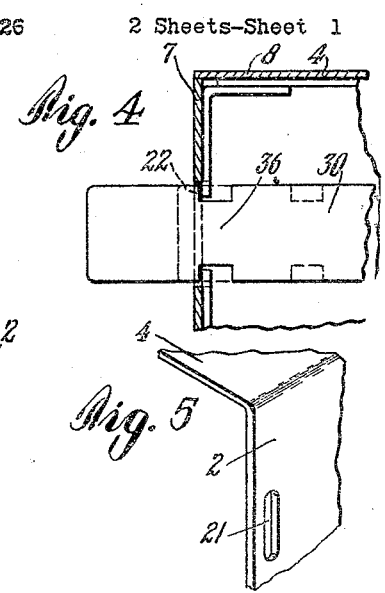
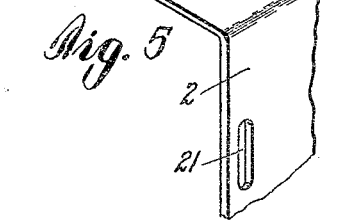
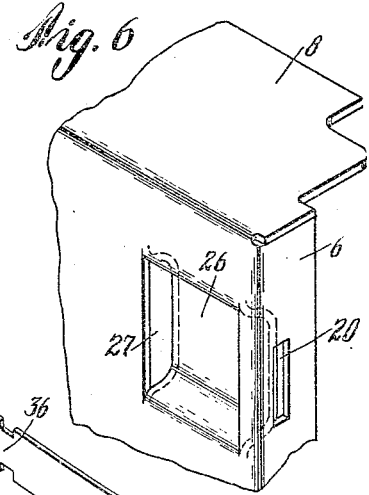
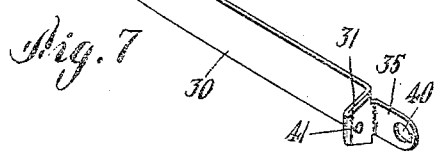
Inventor:
Ernest G. Johansson.

March 17, 1931. E. G. JOHANSSON 1,796,932
CABINET
Filed Nov. 26, 1926 2 Sheets-Sheet 2
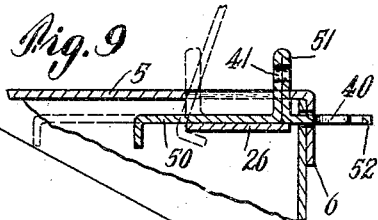
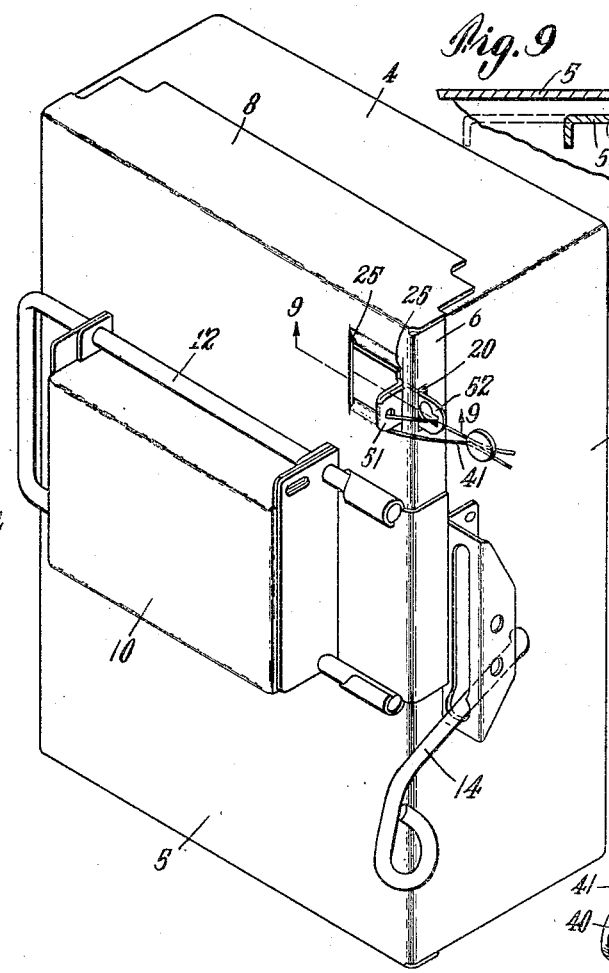
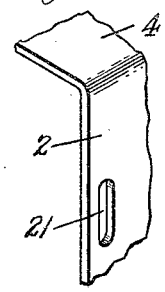
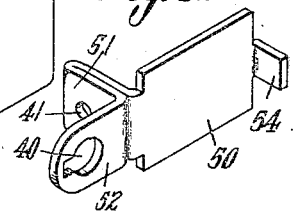
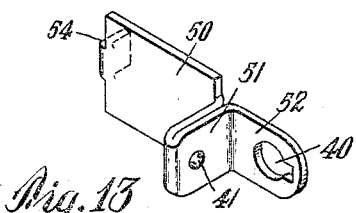
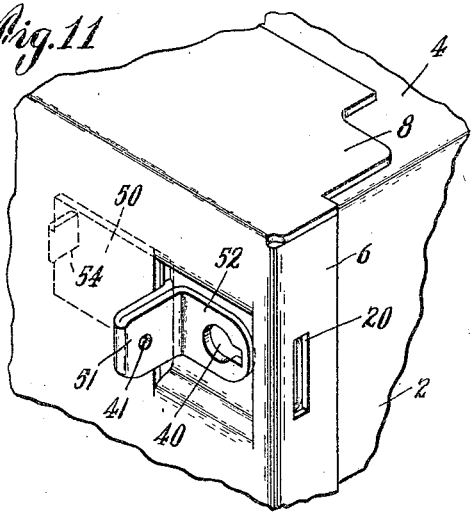
Inventor:
Ernest G. Johansson.
by Wright Brown Quinby Ray
Attys.

Patented Mar. 17, 1931

1,796,932

UNITED STATES PATENT OFFICE

ERNEST G. JOHANSSON, OF BOSTON, MASSACHUSETTS, ASSIGNOR, BY MESNE ASSIGNMENTS, TO THE PALMER ELECTRIC & MANUFACTURING CO., OF WALTHAM, MASSACHUSETTS, A CORPORATION OF MASSACHUSETTS

CABINET

Application filed November 26, 1926. Serial No. 150,791.

This invention relates to cabinets, more particularly such as are designed to house electrical devices to prevent unauthorized access thereto. Such cabinets are customarily employed to house the circuit protecting devices and switches used in connection with meters. These cabinets are commonly provided with covers which may be opened when access to the devices contained in the cabinets is desired, these covers being closed and sealed in closed position at other times and during normal functioning of the electric circuit in which such devices are used.

The present invention is more particularly directed to means for securing the covers in closed position. Two constructions for this purpose have heretofore commonly been used. In one of these a bar carried by a fixed part of the cabinet extends through a hole in the cover when the cover is closed, this bar having a hole therethrough to receive a sealing wire outwardly of the closed cover. In the other, apertures are provided through the cover and an adjacent fixed wall of the cabinet, a sealing wire being threaded through these apertures. In each of these constructions the seal wire itself has to provide sufficient mechanical strength to prevent the opening of the cover.

According to the present invention a sealing bar or bolt is employed to fasten the bar to the cabinet, this bar or bolt presenting much greater strength than can be afforded by a sealing wire against breaking open the cabinet, and relieving the sealing wire, if one is to be used, from the duty of holding the cover closed. It also makes possible the use of a stronger sealing means than the wire, as for example, a padlock if this is desired.

For a more complete understanding of this invention, reference may be had to the accompanying drawings in which Figure 1 is a perspective of a cabinet showing one form of fastening embodying this invention.

Figure 2 is a perspective of a portion of the same showing parts broken away.

Figures 3 and 5 are detail perspectives of certain wall portions of the cabinet.

Figure 4 is a sectional detail, the cover being closed.

Figure 6 is a detail perspective of a cover portion.

Figure 7 is a perspective of a latch bar.

Figure 8 is a view similar to Figure 1, but showing a modified construction.

Figure 9 is a sectional detail, the section being taken on the line 9—9 of Figure 8.

Figure 10 is a detail in perspective of a wall portion.

Figure 11 is a detail perspective to a larger scale than shown in Figure 8, the latch bar being in retracted position.

Figures 12 and 13 are perspectives of the latch bar.

Referring first to the form shown in Figures 1 to 7, the cabinet, as shown, comprises a box like structure having a base 1, opposite side walls 2 and 3, a top wall 4 and bottom wall (not shown). The side, top and bottom walls are bridged over when the cabinet is closed by a cover 5, this cover as shown having flanges 6 and 7 overlapping the side walls 2 and 3, a flange 8 overlapping the top wall 4 and a flange 9 overlapping the bottom wall. While this cover may be of any suitable design, as shown it has hinged thereto an enclosure portion 10 which may be locked in closed position by a slidable U shaped rod 12 arranged in interlocking relation to a movable switch handle 14. This cover 10 is arranged to bridge over fuses contained within the cabinet which may be rendered accessible by swinging outwardly the enclosure portion 10 which can be done only when the switch arm 14 is in switch open position. This construction is more particularly disclosed and claimed in my application Serial No. 99,391, filed April 2, 1926, for safety switches. It should be understood, of course, that the present invention is not limited to any particular type of casing, the one shown being merely by way of example.

The flange 6, as shown, has an aperture 20 therethrough, which when the cover is in closed position registers with an aperture 21 in the wall member 2. The flange 7 is provided with an aperture 22 similar to the aperture 20 and as shown is positioned opposite thereto. The wall member 3 is also provided with an aperture 23 with which the aperture 22 registers when the cover is in closed position, but this aperture 23 is open through a slot 24 of less width than the aperture through the edge of wall member 3, the aperture 23 and the slot 24 together forming a T shaped notch in that edge.

Intermediate the flanges 6 and 7 the forward face of the cover 5 is provided with a pair of spaced substantially parallel slits 25, the material 26 between these slits being offset rearwardly to form a loop in a plane back of that of the remainder of the front wall of the cover 5 and forming a pocket in this front wall having its opposite sides open as at 27, these openings being formed by the slits 25. This loop 26 serves to retain against the rear face of the cover 5 a latch bar 30. As shown best in Figure 7, this latch bar has a forwardly projecting portion 31 which may well be formed by bending the material of the bar on itself, this projection 31 projecting outwardly of the pocket, as shown best in Figures 1 and 2, and serving as a handle portion and providing with the edges at the slots 25 a stop for limiting the extent of sliding movement of the latch bar relative to the cover. The end 35 of the latch bar adjacent to the projection 31 is so formed as to permit it to be projected through the apertures 20 and 21 of the cover and side wall 2, respectively, when the projection 31 is moved over toward the flange 6, this end so projected acting to hold the flange 6 against disengagement from the wall 2. The bar 30 extends through the apertures 23 and 22 of the wall 3 and the cover flange 7, respectively, and when the bar is moved to its fastening position wherein the end 35 is projected through the apertures 20 and 21, it acts also to secure the flange 7 to the wall member 3, the portion of the latch bar then in the aperture 23 being too wide to pass out through the slot 24. Inwardly from the end of the bar 30 adjacent to the wall member 3, however, it is provided with a portion 36 sufficiently reduced in width over the adjacent portion of the bar as to permit it to pass through the slot 24. This reduced portion 36 is so positioned in the bar 30 that when the latch bar is retracted, the portion 31 bringing up against the wall of the slot 25 remote from the flange 6 so as to bring the end 35 out of engagement with the apertures 20 and 31, that it passes into the aperture 23. In this position the latch bar may pass outwardly through the notch 34 so that it is ineffective in holding the cover flange 7 to the wall 3. It will thus be seen that when the latch bar is moved in one direction to its limit of motion, both flanges 6 and 7 are out of securing engagement with the corresponding sides 2 and 3 of the cabinet, and that when the latch bar is moved to its other limit both flanges are secured to their adjacent wall members.

The end portion 35 is shown as provided with an aperture 40 through which a suitable sealing member may be passed, and, if desired, the portion 31 may be perforated as shown at 41 so that the sealing wire 42 may be passed through both these apertures and hold the bolt or bar 30 against movement to its releasing position. The aperture 40 may be of sufficient size to permit the loop of a padlock to be placed therethrough if it is desired to hold the bar in securing position by such means. The bar 30 is inserted in position when somewhat bent and is then sprung into position and straightened so that it thereafter is held firmly to the cover of the cabinet, the bar and cover being formed complementally so as to prevent disengagement thereof. The bar itself when in securing position through its own inherent strength retains the cover in closed position, the sealing means not being called upon to perform this function, and in the construction herein shown the cover is held to opposite side walls of the cabinet which effectually prevents the cover from being sprung away from the cabinet at any point so as to permit unauthorized access to the interior thereof.

In Figures 8 to 13 a modified construction has been shown in which the fixing of the cover to the cabinet is accomplished at one point only. The cabinet therein shown is of the same general construction as illustrated in Figure 1 having side flanges and top and bottom flanges lapping the corresponding walls of the cabinet. The side walls 6, as in the construction shown in Figure 1, are provided with the aperture 20 and the corresponding wall 2 of the cabinet is provided with a similar aperture 21. The front wall of the cover 5 is provided with the spaced slits 25, the material therebetween being bent rearwardly to form the loop 26. The latch bar in this construction, however, as best illustrated in Figures 12 and 13 comprises a relatively short piece 50 having an outwardly projecting portion 51 similar to the projecting portion 31 illustrated in Figure 7 and a perforated end portion 52 similar to the end portion 35 and which may be projected through the apertures 20 and 21 of the cover flange and wall member 2, respectively, to secure these parts together. The projecting portion 51 provides a stop to limit the extent of sliding movement of the bar 50 in the same manner that the projecting portion 31 of the construction shown in Figure 7 functions. Instead, however, of the latch bar being of sufficient length to secure the opposite cover flange and side wall together, it is of sufficient length only to pass through the slit 25 farthest removed from the flange 6 and beyond this slit 25 it may be provided with a narrow tongue portion 54. This tongue portion 54, when the parts are to be assembled is in the plane of the portion 50 but after the latch member has been inserted in the proper position with its portion 51 projecting forwardly from the pocket formed by the offset loop portion 26, this tongue 54 is bent to substantially right angle relation to the portion 50, as illustrated in Figures 9, 11, 12 and 13, whereupon it prevents the disengagement of the latch bar 50 from the cover while permitting this latch bar to be slid relative to the cover into and out of securing position. It is shown in securing position in Figure 8 and out of such position in Figure 11.

Having thus described certain embodiments of this invention it should be evident to those skilled in the art that various changes and modifications might be made therein without departing from its spirit or scope as defined by the appended claims.

I claim:

1. A cabinet comprising side walls and a cover having a flange lapping one of said walls when the cabinet is closed, said cover having a portion defined by spaced slits offset from the plane of the cover adjacent thereto to define a pocket, such flange and one side wall having apertures registering when said cabinet is closed, and a latch element movable in said pocket and projecting through said slits, said element being projectable through said apertures when said cabinet is closed to hold said cover to said wall.

2. A cabinet comprising side walls and a cover having a flange lapping one of said walls when the cabinet is closed, said cover having a portion defined by spaced slits offset from the plane of the cover adjacent thereto to define a pocket, such flange and one side wall having apertures registering when said cabinet is closed, a latch element movable in said pocket and projecting through said slits, said element being projectable through said apertures when said cabinet is closed to hold said cover to said wall, and means for holding said latch element in such projected position.

3. A cabinet comprising side walls and a cover having a flange lapping one of said walls when the cabinet is closed, said cover having a portion defined by spaced slits offset from the plane of the cover adjacent thereto to define a pocket, such flange and one side wall having apertures registering when said cabinet is closed, and a latch element movable in said pocket and projecting through said slits, said element being projectable through said apertures when said cabinet is closed to hold said cover to said wall, said latch element having a portion projecting from said pocket and acting to limit the extent of movement of said member by impingement on edge portions of said cover at said slits.

4. A cabinet comprising side walls and a cover having a flange lapping one of said walls when the cabinet is closed, said cover having a portion defined by spaced slits offset from the plane of the cover adjacent thereto to define a pocket, such flange and one side wall having apertures registering when said cabinet is closed, and a latch element movable in said pocket and projecting through said slits, said element being projectable through said apertures when said cabinet is closed to hold said cover to said wall, said latch element having a portion projecting from said pocket and acting to limit the extent of movement of said member by impingement on edge portions of said cover at said slits, said projecting portion and an end of said element extending beyond said apertures when in locking position being perforated for the reception of sealing means.

5. A cabinet comprising side walls and a cover having a flange lapping one of said walls when the cabinet is closed, said cover having a portion defined by a pair of spaced substantially parallel slits offset inwardly to form a pocket, said flange and lapping wall having apertures mating when said cover is in closed position opposite to said pocket and adjacent to one of said slits, and a latch bar extending through said slits and of substantially the width of said pocket, said element having an end portion projectable through said apertures to lock said cover closed, and a stop to limit the extent of such projection.

6. A cabinet comprising opposite wall members, a cover having flanges lapping said wall members when said cover is in closed position, one of said flanges and its mating wall member having apertures registering when said cover is in closed position, the other of said flanges and the other wall member also having apertures registering when said cover is in closed position, a latch bar slidably carried by said cover and extending through the apertures of said other flange and wall member and having one end projectable through said apertures in said one flange and wall member, thereby to hold the cover in closed position at each of said wall members, said latch bar having a reduced portion positioned in said other wall aperture when said end is retracted from the aperture of said one flange and wall member, and said other wall member having a slot opening into its aperture of sufficient size to permit said reduced portion to pass out of said other wall aperture, whereby the cover may be opened when said latch bar is in such retracted position.

7. A cabinet comprising opposite wall members, a cover having flanges lapping said wall members when said cover is in closed position, one of said flanges and its mating wall member having apertures registering when said cover is in closed position, the other of said flanges and the other wall member also having apertures registering when said cover is in closed position, said cover having a pair of spaced slits, the material between said slits being offset to form a latch retaining loop, a latch bar slidable through said slits and held to said cover by said loop, said bar extending through the apertures of said other flange and wall member and having one end projectable through said apertures in said one flange and wall member, thereby to hold the cover in closed position at each of said wall members, said latch bar having a reduced portion positioned in said other wall aperture when said end is retracted from the aperture of said one flange and wall member, and said other wall member having a slot opening into its aperture of sufficient size to permit said reduced portion to pass out of said other wall aperture, whereby the cover may be opened when said latch bar is in such retracted position.

8. In combination, a pair of spaced side wall members, a cover, said wall members and cover having portions lapping past each other when the cover is closed, and a latch member movable between two positions in one of which it secures both of said wall members each to the lapping portion of said cover and in the other of which said cover is released from both of said wall members.

9. A latch mechanism comprising a bar having a latch portion at one end and a notch adjacent to the opposite end, said portion and notch being so spaced that said notch is in registry with one pair of members and permits the separation of said members when said portion is retracted from latching engagement with another pair of members.

10. In combination, a pair of spaced side wall members, a cover, and a latch bar cooperating with both side wall members in one position to secure said side wall members to said cover and in another position to release said cover from both of said side wall members.

In testimony whereof I have affixed my signature.

ERNEST G. JOHANSSON.